(12) United States Patent
Rich et al.

(10) Patent No.: US 12,395,001 B2
(45) Date of Patent: Aug. 19, 2025

(54) USE OF HEATING ELEMENTS AS A DIAGNOSTIC AND OPTIMAL SETTING TOOL FOR MULTIPLE OUTPUT DYNAMICALLY ADJUSTABLE CAPACITY SYSTEM

(71) Applicant: GM Global Technology Operations LLC, Detroit, MI (US)

(72) Inventors: Dave Gerard Rich, Sterling Heights, MI (US); James Morrison, Sebringville (CA); Robert A. De Stefano, Macomb Township, MI (US); Michael L. Mullin, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 302 days.

(21) Appl. No.: 18/163,514

(22) Filed: Feb. 2, 2023

(65) Prior Publication Data

US 2024/0266861 A1    Aug. 8, 2024

(51) Int. Cl.
*H02J 7/00* (2006.01)
*B60R 16/02* (2006.01)

(52) U.S. Cl.
CPC ........ *H02J 7/007194* (2020.01); *B60R 16/02* (2013.01)

(58) Field of Classification Search
CPC .... H02J 7/007194; H02J 7/0047; H02J 7/005; H02J 7/0063; B60R 16/02; B60L 3/0023; B60L 3/0046; B60L 58/10; B60L 58/16; H01M 10/42
See application file for complete search history.

(56) References Cited

U.S. PATENT DOCUMENTS

| | | | | |
|---|---|---|---|---|
| 2006/0109042 | A1* | 5/2006 | Hsu | H03H 11/24 |
| | | | | 327/276 |
| 2016/0363634 | A1* | 12/2016 | Cheng | G01R 31/3647 |
| 2018/0145374 | A1* | 5/2018 | White | H05B 1/023 |
| 2022/0057455 | A1* | 2/2022 | Fasching | H02J 7/0048 |
| 2022/0348007 | A1* | 11/2022 | Martin | B41J 2/0452 |

\* cited by examiner

*Primary Examiner* — Metasebia T Retebo
(74) *Attorney, Agent, or Firm* — CANTOR COLBURN LLP

(57) ABSTRACT

A Multiple Output Dynamically Adjustable Capacity (MODACS) and a method of operation of the MODACS. The MODACS includes a cell, a load in thermal communication with the cell, and a processor. A voltage is applied to a load to generate heat at a cell of the MODACS, wherein the heat affects a temperature of the cell. The processor measures a parameter of the cell in response to the heat and controls an operation of the MODACS based on the parameter of the cell.

20 Claims, 6 Drawing Sheets

USE OF HEATING ELEMENTS AS A DIAGNOSTIC AND OPTIMAL SETTING TOOL FOR MULTIPLE OUTPUT DYNAMICALLY ADJUSTABLE CAPACITY SYSTEM

INTRODUCTION

The subject disclosure relates to operation of Multiple Output Dynamically Adjustable Capacity System (MODACS) in a vehicle and, in particular, to a system and method for diagnosing a health of the MODACS using a controlled heating.

A MODACS is a power unit for a plurality of electrical units of a vehicle. The MODACS includes a plurality of energy storage strings that can be configured as needed to meet the changing power demands of the vehicle as required by the plurality of electrical units. Over time, a health of an energy string deteriorates. When this occurs, it can be useful to change an operating set point of the string to be able to meet power demands of the electrical units. Additionally, the operating temperature of the string can have an effect on the efficiency of the string. Accordingly, it is desirable to provide a system and method for diagnosing the state of health of an energy storage string based on a heating signal to thereby establish an operating set point for the energy storage based on the diagnosis.

SUMMARY

In one exemplary embodiment, a method of operating a Multiple Output Dynamically Adjustable Capacity System (MODACS) is disclosed. A voltage is applied to a load to generate heat at a cell of the MODACS, wherein the heat affects a temperature of the cell. A parameter of the cell is measured in response to the heat. An operation of the MODACS is controlled based on the parameter of the cell.

In addition to one or more of the features described herein, the load is at least one of an isolated programmable load, a field effect transistor (FET) internal to the MODACS, a FET powered by the cell, and a FET isolated from the cell. The isolated programmable load is a FET and the voltage is a pulsed voltage pattern applied at a gate of the FET. Applying the voltage to the load generates a current through the cell. The method further includes generating the heat at the by at least one of convection via applying the voltage at the load and conduction via passing the current through the cell. The method further includes measuring the parameter of an equivalent circuit model of the cell. The method further includes comparing the parameter of the equivalent circuit model to the parameter of an ideal model of the cell to perform at least one of determining a state of health of the MODACS and determining a set point for operating the MODACS based on the state of health. The equivalent circuit model includes an RC pair and the parameter is one of a decay rate of the RC pair and a voltage across the RC pair. Controlling the operation of the MODACS further includes performing at least one of maintaining the temperature of the cell within a desired temperature range, draining the cell, and operating the MODACS at a determined SOC set point for the cell. The method further includes taking the cell offline and applying the voltage to the load when the cell is offline.

In another exemplary embodiment, a Multiple Output Dynamically Adjustable Capacity System (MODACS) is disclosed. The MODACS includes a cell, a load in thermal communication with the cell, and a processor. The processor is configured to apply a voltage to the load to generate heat at the cell, wherein the heat affects a temperature of the cell, measure a parameter of the cell in response to the heat, and control an operation of the MODACS based on the parameter of the cell.

In addition to one or more of the features described herein, the load is at least one of an isolated programmable load, a field effect transistor (FET) internal to the MODACS, a FET powered by the cell, and a FET isolated from the cell. The isolated programmable load is a FET and the voltage is a pulsed voltage pattern applied at a gate of the FET. Applying the voltage to the load generates a current through the cell. The heat is generated at the cell by at least one of convection via applying the voltage at the load and conduction via passing the current through the cell. The processor is further configured to measure the parameter of an equivalent circuit model of the cell. The processor is further configured to compare the parameter of the equivalent circuit model to the parameter of an ideal model of the cell to perform at least one of determining a state of health of the MODACS and determining a set point for operating the MODACS based on the state of health. The equivalent circuit model includes an RC pair and the parameter is one of a decay rate of the RC pair and a voltage across the RC pair. The processor is further configured to control the operation of the MODACS to perform at least one of maintaining the temperature of the cell within a desired temperature range, draining the cell, and operating the MODACS at a determined SOC set point for the cell. The processor is further configured to take the cell offline and apply the voltage to the load when the cell is offline.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
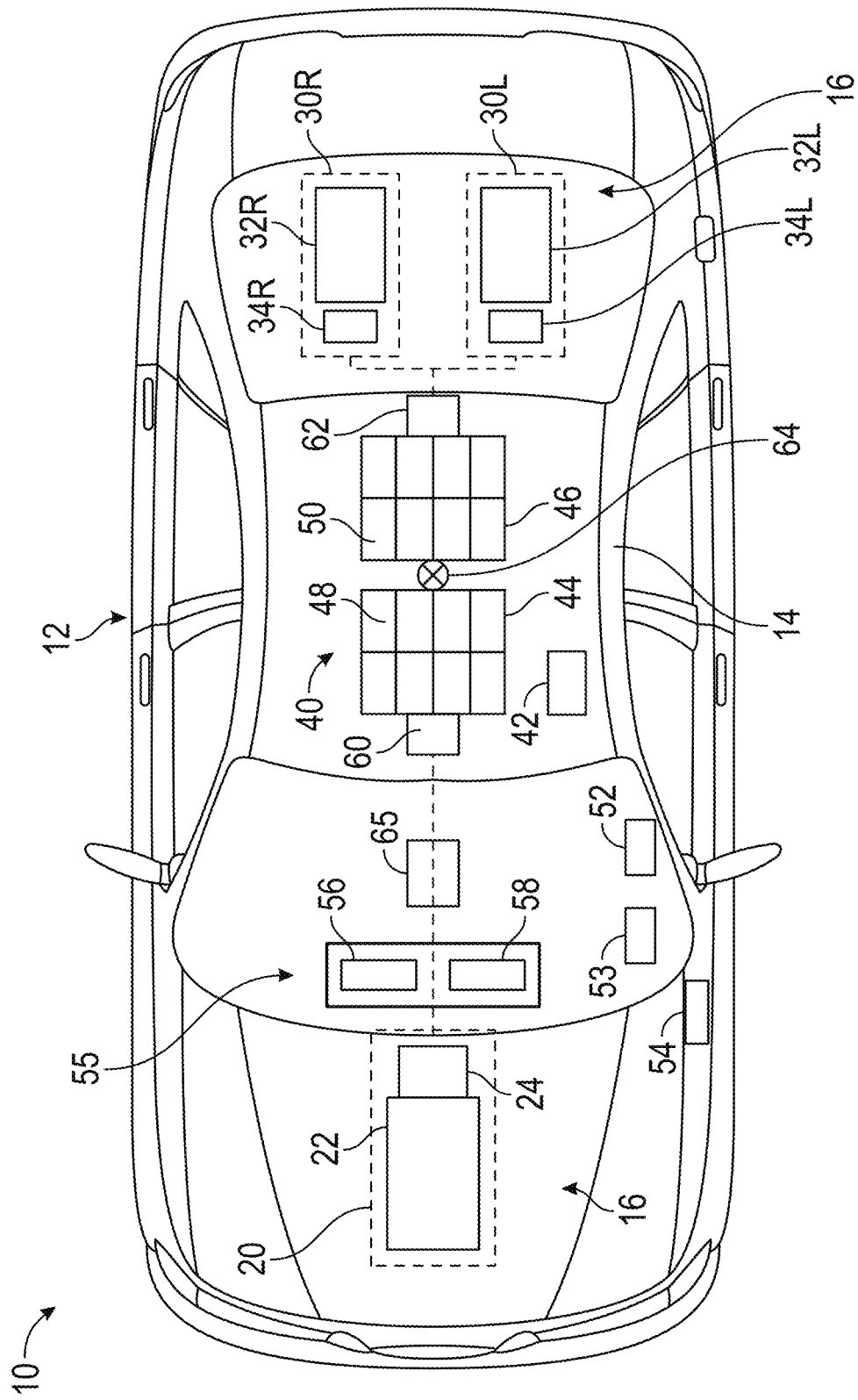
FIG. 1 shows an embodiment of a motor vehicle, which includes a vehicle body.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes an electric motor 32L and an inverter 34L. A right rear drive unit 30R includes an electric motor 32R and an inverter 34R. The inverters 24, 34L and 34R (e.g., power inverter units or PIMs) each convert DC power from a high voltage (HV) battery system 40 to poly-phase (e.g., two-phase, three-phase, six-phase, etc.) alternating current (AC) power to drive the motors 22 and 32L and 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives front wheels (not shown) and the rear electric motors 32L and 32R drive rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the drive units 20, 30L and 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the inverter 24, and a second battery pack 46. The battery pack 44 includes a plurality of battery modules 48, and the battery pack 46 includes a plurality of battery modules 50. Each module 48, 50 includes a number of individual cells (not shown). In various embodiments, one or more of the battery packs can include a MODACS (Multiple Output Dynamically Adjustable Capacity) battery, as described herein with respect to FIGS. 2-4.

Each of the front electric motor 22 and the rear motors 32L and 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the battery packs 44 and 46, and selectively connecting the battery packs 44 and 46 to the drive units 20, 30L and 30R. The switching devices may also be operated to selectively connect the battery pack 44 and the battery pack 46 to a charging system. The charging system can be used to charge the battery pack 44 and the battery pack 46, and/or to supply power from the battery pack 44 and/or the battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects to the battery pack 44 to the inverters 24, 34L and 34R, and a second switching device 62 that selectively connects the battery pack 46 to the inverters 24, 34L and 34R. The switching system also includes a third switching device 64 (also referred to as a "battery switching device") for selectively connecting the battery pack 44 to the battery pack 46 in series.

Any of various controllers can be used to control functions of the battery system 40, the switching system and the drive units. A controller includes any suitable processing device or unit, and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

As illustrated herein, the vehicle 10 is an electric vehicle. In an alternative embodiment, the vehicle 10 can be an internal combustion engine vehicle, a hybrid vehicle, etc.

Figure 2:
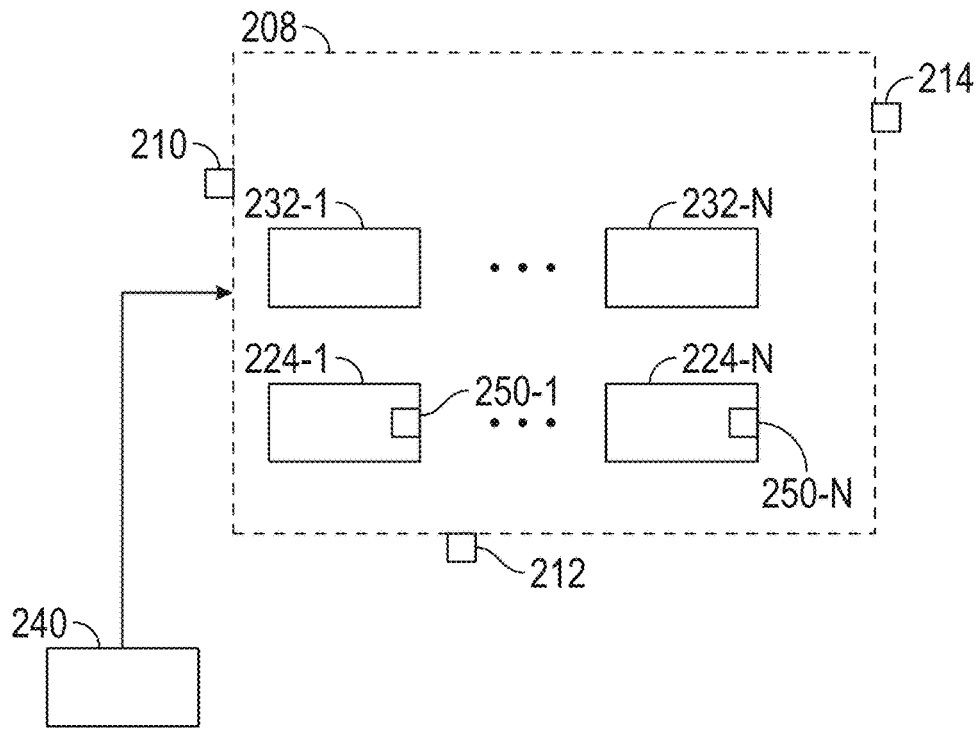
FIG. 2 is a functional block diagram of an example battery system of the vehicle.

FIG. 2 is a functional block diagram of an example battery system of the vehicle. The battery 208 has at least two (positive) output terminals and a negative terminal to provide at least two direct current (DC) operating voltages. For example only, the battery 208 may have a first positive (e.g., 48 Volt (V) nominal) terminal 210, a negative terminal 212, and a second positive (e.g., 12 V nominal) terminal 214.

While the example of the battery 208 having a 48 V nominal operating voltage and a 12 V nominal operating voltage is provided, the battery 208 may have one or more other operating voltages (as well as a plurality of 12V and/or 48V terminals).

The battery 208 includes a plurality of battery modules, such as a first battery module 224-1, . . . , and an N-th battery module 224-N ("battery modules 224"), where N is an integer greater than or equal to 2. In various implementations, N may be equal to 2, 3, 4, 5, 6, 8, 10, 12, or another suitable number.

As discussed further below with respect to FIG. 4, each of the battery modules 224 includes multiple battery strings. Each battery string may be individually replaceable. The ability to individually replace the battery strings may enable the battery 208 to include a shorter warranty period and have a lower warranty experience. The battery strings are also individually isolatable, for example, in the event of a fault in a battery string. In various implementations, the battery 208 may have the form factor of a standard automotive grade 12 V battery.

The battery 208 includes a plurality of switches, such as first switches 232-1, . . . , N-th switches 232-N (collectively "switches 232"). The switches 232 enable the battery strings of the battery modules 224 to be connected in series, parallel, or combinations of series and parallel to provide target output voltages and capacities at the output terminals.

A switch control module 240 controls the switches 232 to provide desired output voltages and capacities at the output terminals.

Figure 3A:
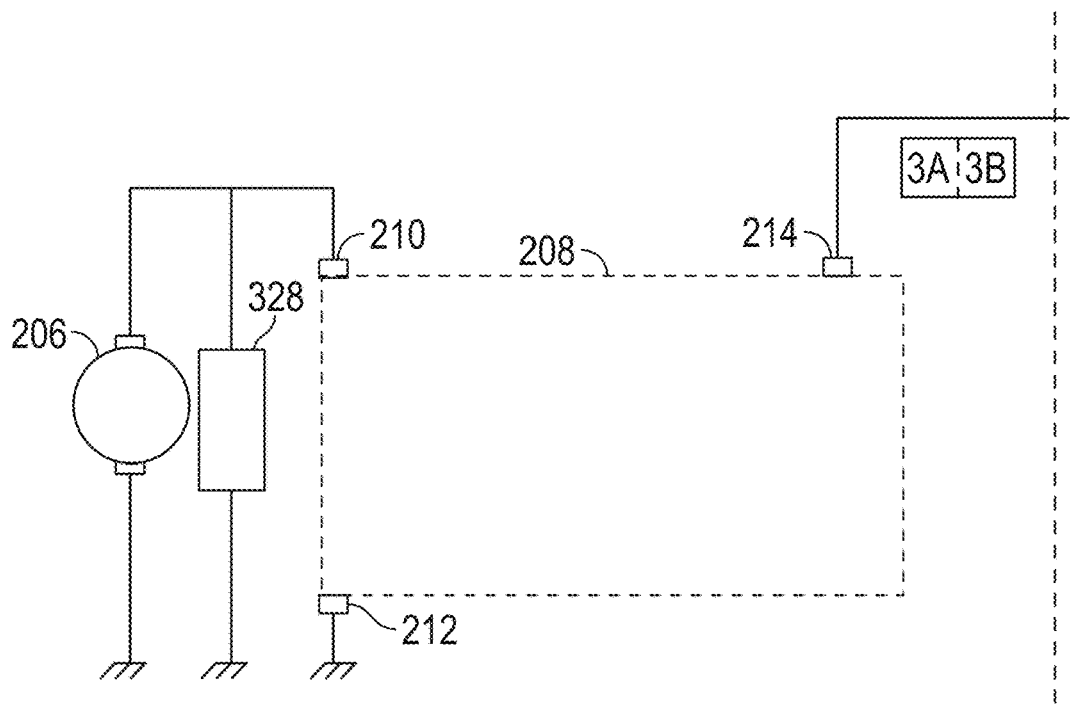
FIGS. 3A-3B are schematic diagrams including an example battery system including the battery.
Figure 3B:
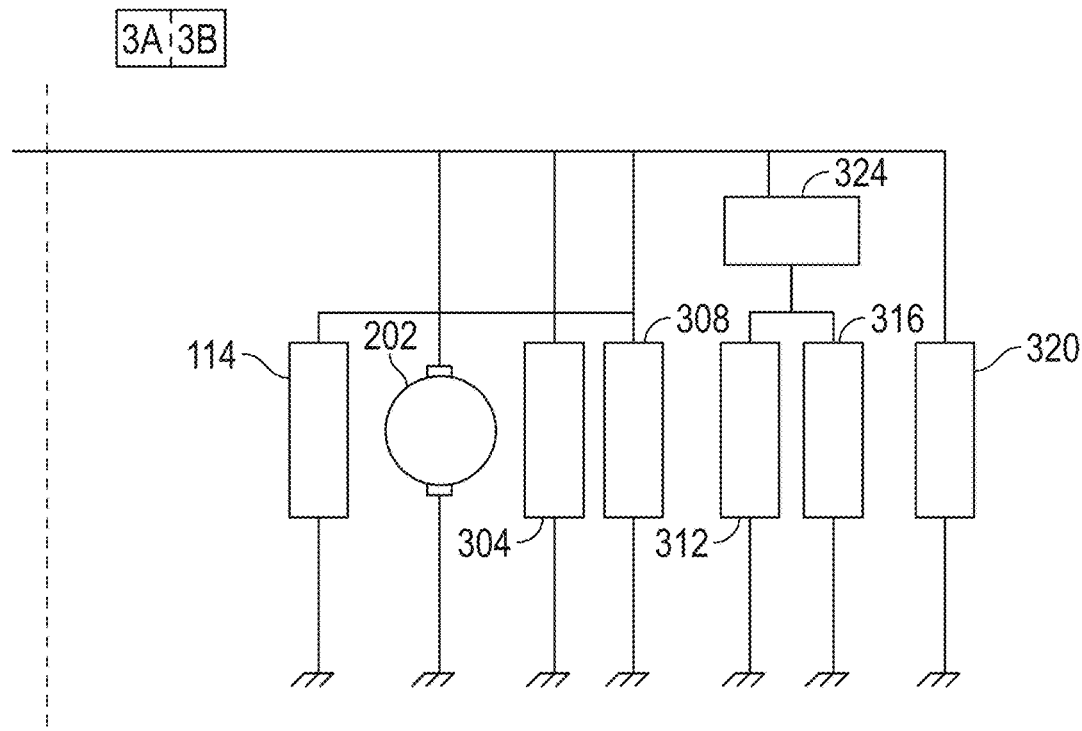

FIGS. 3A and 3B are schematic diagrams including an example battery system including the battery 208. Sets of the battery strings are connectable in series (via ones of the switches 232) to the first positive terminal 210 and the negative terminal 212 to provide a first nominal output voltage (e.g., 48 V) via the first positive terminal 210. Individual ones of the battery strings can be connected (via ones of the switches 232) to the second positive terminal 214 and the negative terminal 212 to provide a second nominal output voltage (e.g., 12 V) via the second positive terminal 214. How many of the battery strings are connected to the first positive terminal 210 and the second positive terminal 214 dictates the portions of the overall capacity of the battery 208 available at each of the positive terminals.

As shown in FIG. 3B, a first set of vehicle electrical components operates using one of the two or more operating voltages of the battery 208. For example, the first set of vehicle electrical components may be connected to the second positive terminal 214. The first set of vehicle electrical components may include, for example but not limited to, an electronic control module 114 and other control modules of the vehicle, a starter motor 202, and/or other electrical loads, such as first 12 V loads 304, second 12 V loads 308, other control modules 312, third 12 V loads 316, and fourth 12 V loads 320. In various implementations, a switching device 324 may be implemented.

As shown in FIG. 3A, a second set of vehicle electrical components operates using another one of the two or more operating voltages of the battery 208. For example, the second set of vehicle electrical components may be connected to the first positive terminal 210. The second set of vehicle electrical components may include, for example but not limited to, the generator 206 and various electrical loads, such as 48 V loads 328. The generator 206 may be controlled to charge the battery 208.

Each of the switches 232 may be an insulated gate bipolar transistor (IGBT), a field effect transistor (FET), such as a metal oxide semiconductor FET (MOSFET), or another suitable type of switch.

Figure 4:
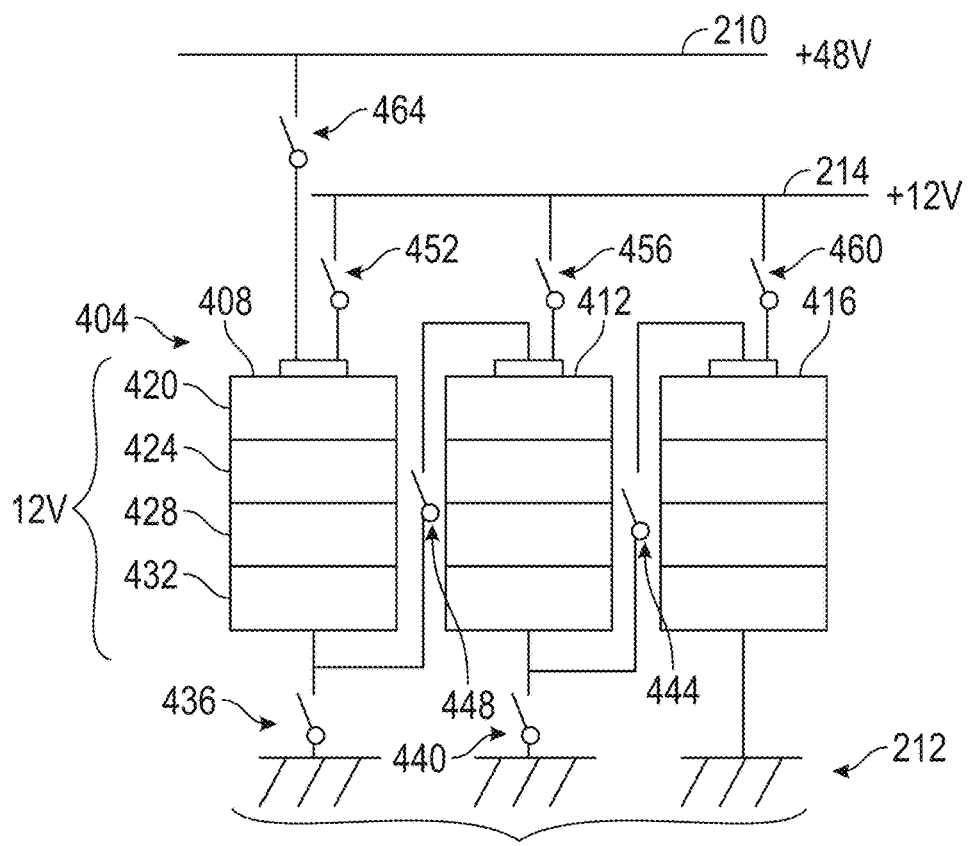
FIG. 4 is a functional block diagram of an example implementation of one of the battery modules.

FIG. 4 is a functional block diagram of an example implementation of one of the battery modules 224, numbered battery module 404, and one set of the switches 232. Each of the battery modules 224 may be identical to 404, and each set of the switches 232 may be connected identically to that of 404.

The battery module 404 includes three battery strings, 408, 412, and 416. The battery strings 408-416 are identical and each include four battery cells 420, 424, 428, and 432. The battery cells 420-432 are connected in series to provide the second operating voltage (e.g., 12 V). Each of the battery cells 420-432 may be, for example, a 3 V battery cell or have another suitable voltage to provide the second operating voltage when the battery cells 420-432 are connected in series. The battery cells 420-432 may be, for example lithium ferrophosphate (LFP) battery cells or NMC (nickel-manganese-cobalt) battery cells or have another suitable chemistry. In various embodiments, the battery cells 420-432 can include cathodes that are made of materials such as LFP and NMC and anodes made of graphite, silicon-based materials or Lithium-Titanate (LTO).

Negative terminals of the battery strings 408-416 are connected to the negative terminal 212. The negative terminals of the battery strings 408 and 412 are connected to the negative terminal 212 via switches 436 and 440, respectively, when the switches 436 and 440 are closed. The switches 436 and 440 can open to disconnect the negative terminals of the battery strings 408 and 412 from the negative terminal 212. The negative terminal of the battery string 416 may be directly connected to the negative terminal 212.

The positive terminal of the battery string 416 is connected to the negative terminal of the battery string 412 such that the battery strings 412 and 416 are connected in series when switch 444 is closed. The switch 444 can be opened to disconnect the positive terminal of the battery string 416 from the negative terminal of the battery string 412. The positive terminal of the battery string 412 is connected to the negative terminal of the battery string 408 such that the battery strings 412 and 408 are connected in series when switch 448 is closed. The switch 448 can be opened to disconnect the positive terminal of the battery string 412 from the negative terminal of the battery string 408.

Switches 452, 456, and 460 respectively connect and disconnect the positive terminals of the battery strings 408, 412, and 416 to and from a first bus (e.g., 12 V bus) that is connected to the second positive terminal 214 of the battery 208. Switch 464 connects and disconnects the positive terminal of the battery string 408 to and from a second bus (e.g., a 48 V bus) that is connected to the first positive terminal 210 of the battery 208.

The switch control module 240, FIG. 2, controls switching of the switches of each of the battery modules 224 (the set of switches). At any given time, the switch control module 240 may actuate the switches associated with a battery module such that the battery module is in an open (X) configuration, a series (S) configuration, or a parallel (P) configuration. FIG. 4 includes an example illustration of the battery module 404 in the open (X) configuration. When a battery module is in the open (X) configuration, all the battery strings of the battery module are disconnected from both the first positive terminal 210 and the second positive terminal 214.

Referring back to FIG. 2, each of the battery modules 224 also includes a plurality of temperature sensors, such as temperature sensors 250-1, . . . , 250-N. For example, one battery temperature sensor may be provided for each battery string and measure a temperature of that battery string.

Figure 5:
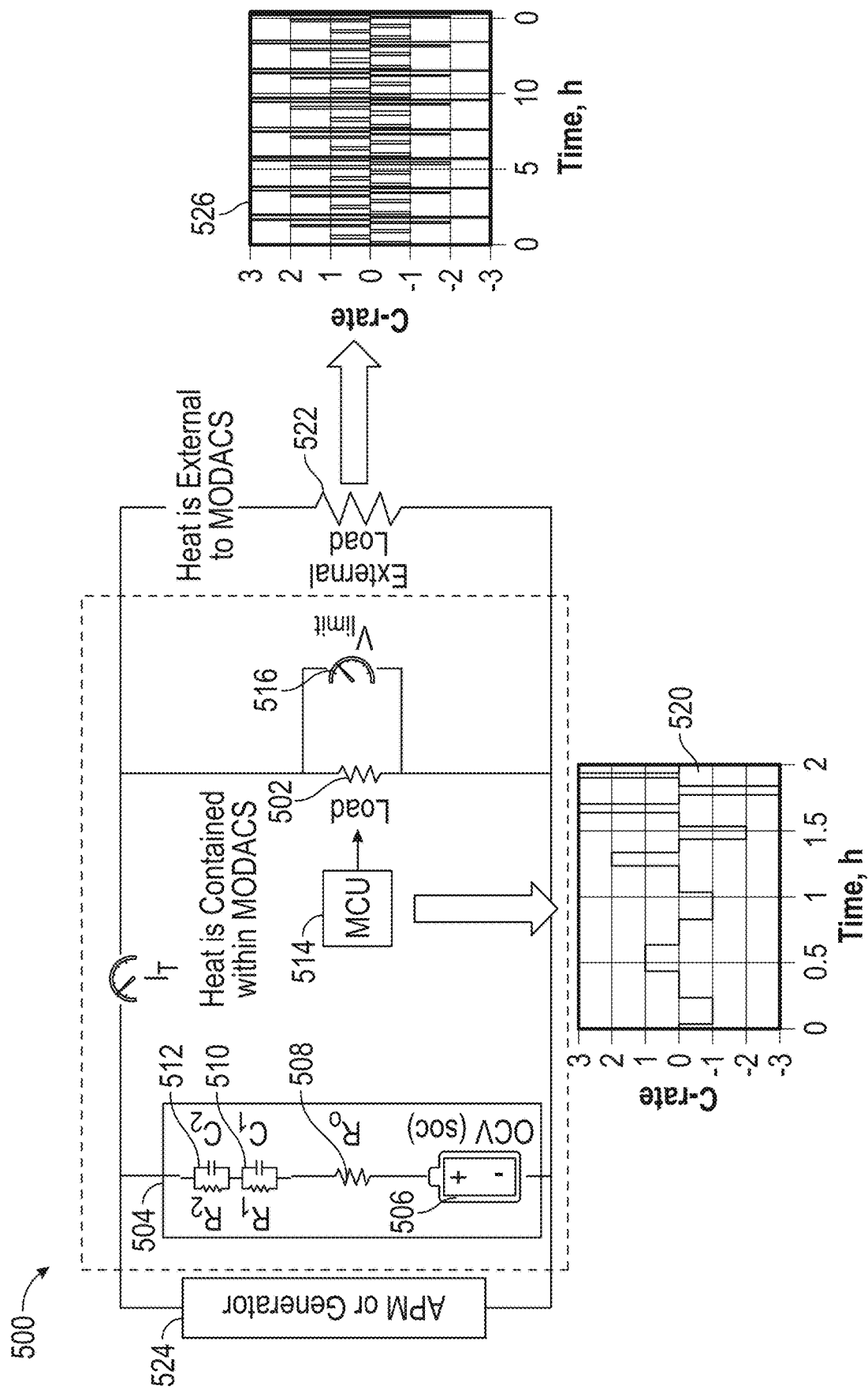
FIG. 5 shows a schematic diagram for a diagnostic circuit for a cell of the battery, in an illustrative embodiment.

FIG. 5 shows a schematic diagram 500 for a diagnostic circuit for a cell of the MODACS, in an illustrative embodiment. The diagnostic circuit includes an isolated programmable load 502 and the cell, which is represented by an equivalent circuit model 504. Although only one cell or equivalent circuit model 504 is shown in the schematic diagram 500, it is understood that the diagnostic system can include a plurality of cells wired in series to form a string of the MODACS. The isolated programmable load 502 can be a resistor or a transistor, such as an isolated field effect transistor (FET). In other embodiments, the isolated FET is an additional FET that is dedicated to heat generation for diagnostic purposes. The MODACS is connected to an external load 522 that is external to the MODACS which can use current from the MODACS for various power operations. An auxiliary power module (APM) or generator 524 is also external to the MODACS.

In various embodiments, the equivalent circuit model 504 includes an internal battery or internal voltage source 506, a first resistor 508, a first RC pair 510, and a second RC pair 512, all in series with each other. The cell (i.e., equivalent circuit model 504) is electrically in parallel with the isolated FET. A microprocessor 514 is coupled to the isolated FET and applies a voltage at the gate of the isolated FET to produce a current in the isolated FET thereby generating heat. Current can also flow through the equivalent circuit model 504, generating heat at the cell through conduction. Thus, heat at the equivalent circuit model 504 can occur due to heat produced at the isolated FET (and received at the cell via convection) as well as heat produced by the flow of current in the cell (i.e., through conduction). The convection heat raises the temperature inside the battery. In various embodiments, the heat can be used to maintain a temperature of the cell or to raise the temperature of the cell to within a suitable temperature range at which the cell performs at an optimal or desired level.

The diagnostic circuit includes a voltage sensor 516 for measuring a voltage across the isolated programmable load 502. Although not shown in FIG. 5, the MODACS also includes additional sensors for measuring voltage, current and temperature at the cell.

In an embodiment, the microprocessor 514 generates a voltage pattern at the gate of the isolated FET to cause the isolated FET to generate heat. The pulsed voltage pattern can be designed to perform various diagnoses on the state of health (SOH) of the cell. An illustrative pulsed voltage pattern is shown by mini-sweep pulse pattern 520 shown in FIG. 5. Time is shown along the abscissa and charging rate is shown along the coordinate axis. The mini-sweep pulse pattern 520 provides a quick identifiable pulse pattern that can be used for heating and subsequent diagnosis of the state of health (SOH) of the cell. The mini-sweep pulse pattern 520 includes multiple changes in charging rate and discharging rate, with nearly immediate changes between different charging rate levels. The mini-sweep pulse pattern 520 is shown as operating the isolated FET in a saturated region. In other embodiments, the mini-sweep pulse pattern 520 can operate the FET in a non-saturated region.

The mini-sweep pulse pattern 520 is one of many possible sweep patterns that can be used to generate heat at the cell and to extract parameters of the equivalent circuit model 504 for the cell. By applying the mini-sweep pulse pattern 520 for diagnostic heating during operation of a cell, the processor can measure and/or update parameters of the equivalent circuit model 504 and compare the parameters to the same parameters of a model of an ideal cell. The ideal cell can be a simulation of the cell. The model of the ideal cell can be a model for a new cell or a healthy cell operating under a given condition, such as at a selected temperature, selected state of charge, etc. In various embodiments, models of a normal or healthy cell at various stages of its life can be stored in a database. The equivalent circuit model 504 can be compared to a stored model that corresponds to the age of the equivalent circuit model. In various embodiments, the models can be stored in a array defined by the aged of the cell and operating temperature of the cell. Interpolation or extrapolation can be applied to the stored models to produce an interpolated model that corresponds to the age of the cell and its operating temperature. A state of health of the cell can be determined by comparing the parameter(s) from the equivalent circuit model 504 to the parameter(s) from the model of the ideal cell under the same conditions. Once the state of health has been determined, the processor can calculate an optimal SOC and/or operating temperature and can operate the cell withing the optimal SOC and/or operating temperature or to meet a required power requirement. The diagnosis and setting the setting point can be performed at the microprocessor 514 or at a remote processor.

In an embodiment, the parameter of the equivalent circuit model 504 is a time constant. By heating the FET and through the pulsed voltage pattern, the RC voltage across the RC pairs of the equivalent circuit model 504 exhibit a decay rate having a calculatable time constant ($\tau=RC$). RC voltage can thus be measured to determine the decay rate of the equivalent circuit model 504. The decay rate can be compared to a decay rate for an ideal cell, healthy cell or to safety standards to evaluate or estimate the state of health of the cell. An optimal operating set point for the battery or cell can then be determined based on the diagnosed state of health of the cell.

In another embodiment, the voltage that occurs at the cell in response to the applied pulsed voltage pattern can be compared to a voltage of the ideal cell under the same pulsed voltage pattern. A comparison of the voltages indicates whether the voltage of the ECM sags or overshoot the voltage of the ideal cell under the same charging rates and discharging rates. If the voltage of the equivalent circuit model 504 is within a selected threshold of the voltage of the ideal cell, the cell is considered to have a SOH sufficient for power requirements of the cell. If the voltage sags or overshoots the voltage of the ideal model by an amount outside of the selected threshold, the cell is considered to have an SOH that is insufficient for power requirements.

In various operations, current can be applied from the cell to the external load 522 to produce a discharge power at the external load Heating at the cells can be prevent or reduce the amount of plating occurring at the cells due to current flow. The vehicle can control the external load to create heating and analyzable pulse patterns 526. The current from the cell heats the cell during power discharge. Since the external load is external to the battery, any heat generated at the external load 522 does not enter into the MODACS and therefore does not heat the cell. Also, when the APM or generator 524 provides power to the external load 522, there is no current through the cell. Thus, use of the APM or generator 524 produces no heating at the cell, either directly through conduction or indirectly through convection.

Figure 6:
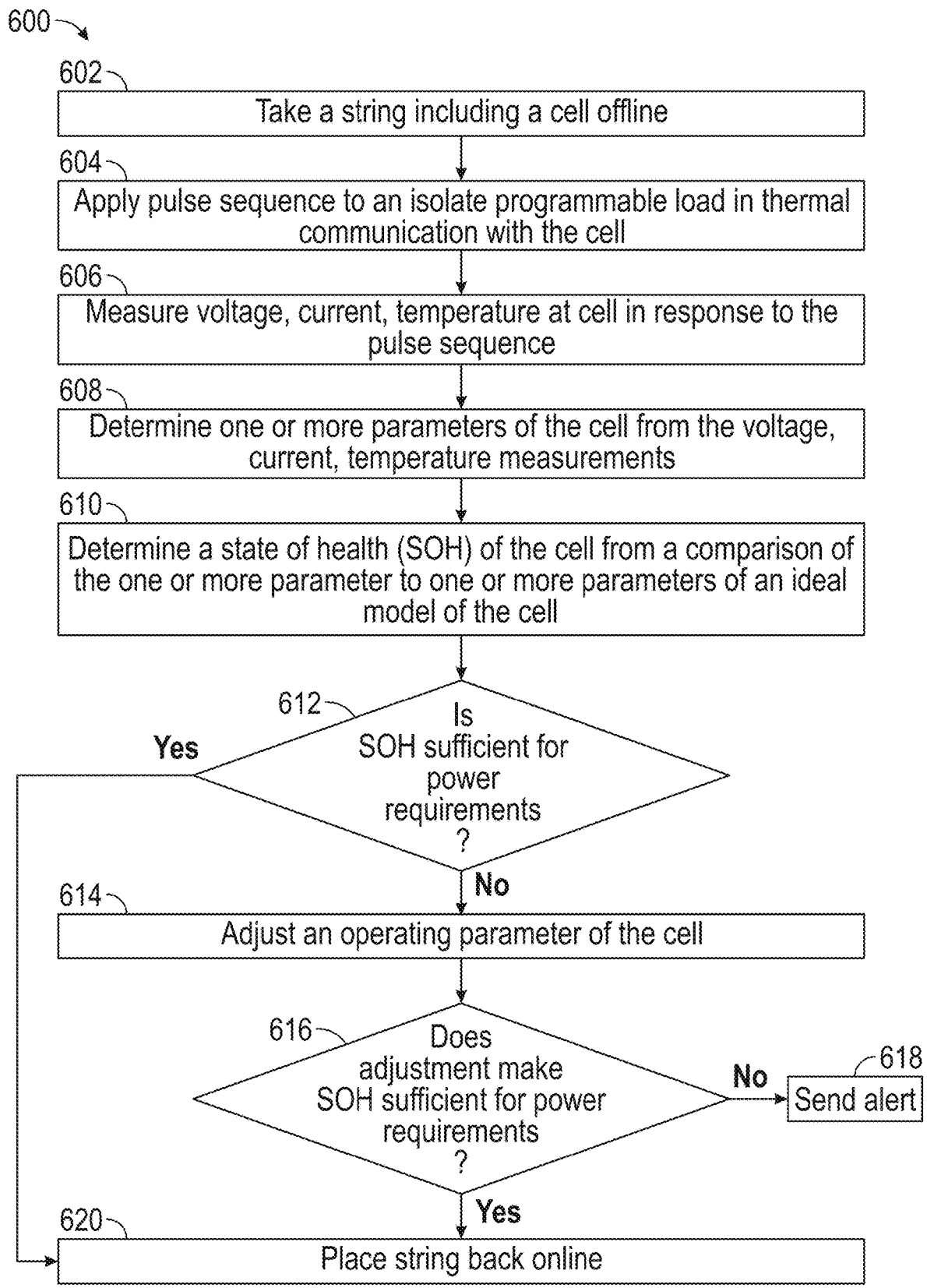
FIG. 6 shows a flowchart of a method for diagnosing a cell of the battery, in an illustrative embodiment.

FIG. 6 shows a flowchart 600 of a method for diagnosing a cell of the MODACS, in an illustrative embodiment. In box 602, a string including the cell is selected from the MODACS and taken offline. In box 604, a pulsed voltage pattern is applied to the isolated programmable load 502 to generate heat at the cell. In box 606, voltage, current and temperature measurements are obtained at the cell in response to the pulsed voltage pattern. In box 608, one or more parameters of the cell are determined from the voltage, current and temperature measurements. In box 610, the one or more parameters of the cell (i.e., equivalent circuit model 504) are compared to one or more parameters of a model of an ideal cell to determine a state of health (SOH) of the cell. In box 612, a determination is made of whether the SOH of cell is sufficient for the cell to meet operating or power requirements. If the SOH is considered sufficient, the method proceeds to box 620. In box 620, the string is restored to online status.

Returning to box 612, if the SOH is insufficient, the method proceeds to box 614. In box 614, an operating parameter of the cell is adjusted so that the cell can meet the power requirements. For example, a performance of the cell can be improved by adjusting or raising a temperature of the cell within a given temperature range. Alternatively, an SOC of the cell can be adjusted. In box 616, a check is made of the efficacy of adjusting the operating parameter. If it is not possible to adjust the operating parameter so that the cell meets power requirements, the method proceeds to box 618. In box 618, an alert signal is sent to indicate the condition of the cell. The cell is kept offline. Returning to box 616, if the operating parameter can be adjusted to make the cell meet power requirements, the method proceeds to box 620. In box 620, the cell is placed back online.

Figure 7:
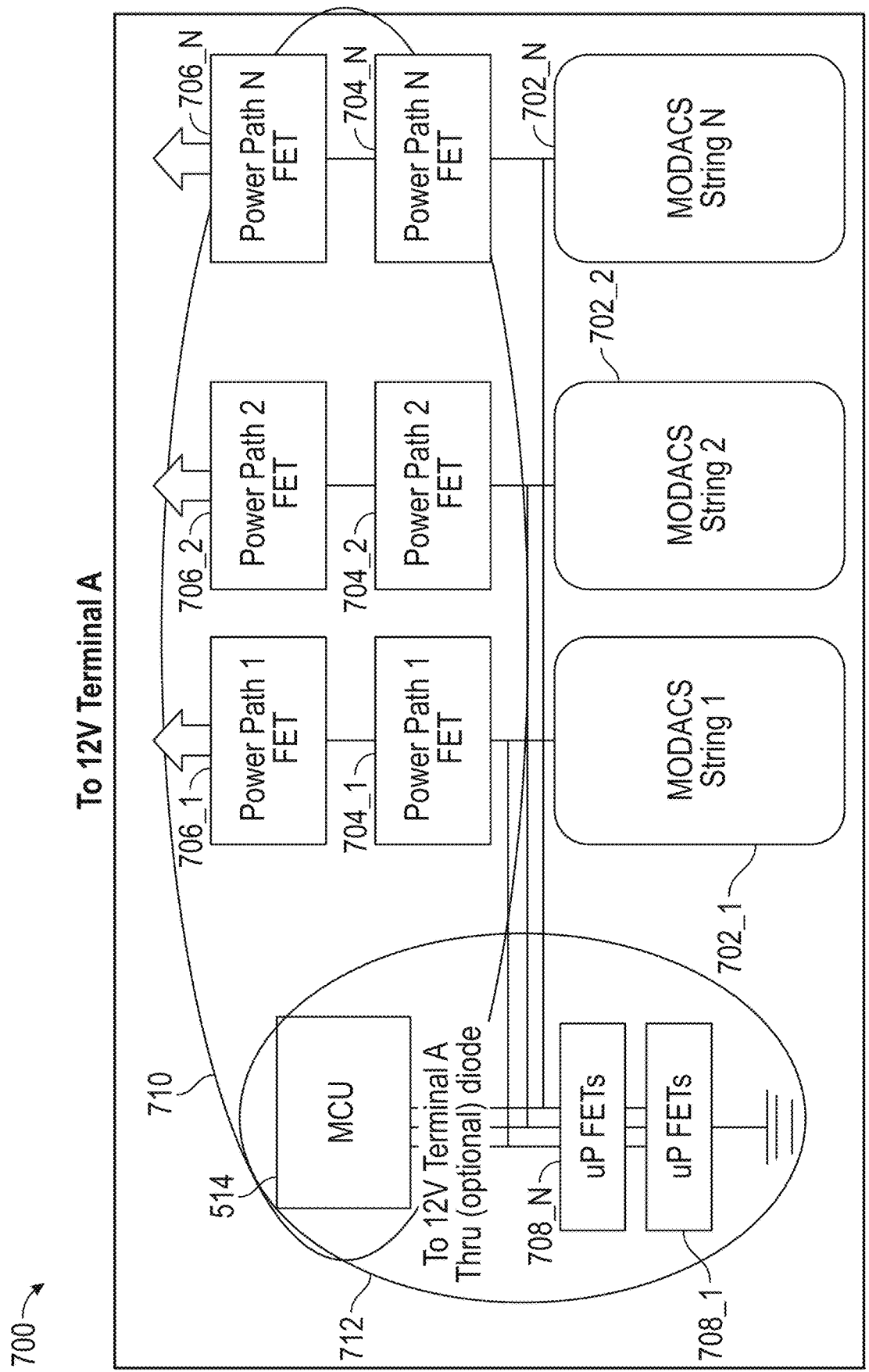
FIG. 7 shows a schematic diagram illustrating a power system for generating heat at a cell of the battery.

FIG. 7 shows a schematic diagram 700 illustrating a power system for generating heat at a cell of the MODACS. The power system includes strings 702_1, . . . , 702_N, with each string including a first power path FET 704_1, . . . , 704_N, respectively, and a second power path FET 706_1, . . . , 706_N, respectively. The power system also includes isolated FETs 708_1, . . . 708_N. The isolated FETs 708_1, . . . , 708-N are isolated programmable loads, such as the isolated programmable load 502 (FET) shown in FIG. 5. In an embodiment, each isolated FET 708_1, . . . 708_N is associated with a corresponding string 702_1, . . . 702_N. For example, isolated FET 1208_1 is associated with string 702_1, etc.

Microprocessor 514 controls heat generation at the strings 7021, . . . 702_N, either individually or together. In one mode, the microprocessor 514 can control operation of a power path FET in order to control heating at its corresponding string, as indicated by loop 710. For example, the microprocessor 514 can provide the pulsed voltage pattern to the first power path FET 704_1 to generate heat at string 702_1. In another mode, the microprocessor 514 can control operation of an isolated FET to control heating at is corresponding string, as shown by loop 712. For example, the microprocessor 514 can provide the pulsed voltage pattern to isolated FET 708_1 to generate heat at string 702_1.

The microprocessor 514 can take the string under test offline for diagnosis while the remaining strings are left online. Once the string under test is found to be healthy or an operating point of the string is changed based on the diagnosis, the microprocessor 514 can place the string under test back online.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a Multiple Output Dynamically Adjustable Capacity System (MODACS), comprising:
applying a voltage to a load and to an equivalent circuit model of a cell of the MODACS, the equivalent circuit model being electrically parallel to the load, wherein applying the voltage to the load generates heat at the equivalent circuit model, thereby affecting a temperature of the equivalent circuit model;
measuring a parameter of the equivalent circuit model in response to the heat generated by the load;
comparing the parameter of the equivalent circuit model to an ideal model of the cell to determine a state of health of the cell; and
controlling an operating parameter of the cell based on the state of heath of the cell to meet a power requirement for the cell.

2. The method of claim 1, wherein the load is at least one of: (i) an isolated programmable load; (ii) a field effect transistor (FET) internal to the MODACS; (iii) a FET powered by the cell; and (iv) a FET isolated from the cell.

3. The method of claim 2, wherein the isolated programmable load is a FET and the voltage is a pulsed voltage pattern applied at a gate of the FET.

4. The method of claim 1, wherein applying the voltage to the load generates a current through the cell.

5. The method of claim 4, further comprising generating the heat at the by at least one of: (i) convection via applying the voltage at the load; and (ii) conduction via passing the current through the cell.

6. The method of claim 1, further comprising comparing the parameter of the equivalent circuit model to the parameter of an ideal model of the cell determine a set point for operating the MODACS based on the state of health.

7. The method of claim 6, wherein the equivalent circuit model includes an RC pair and the parameter is a decay rate of the RC pair.

8. The method of claim 1, wherein controlling the operating parameter of the cell further comprises performing at least one of: (i) draining the cell; and (ii) operating the MODACS at a determined SOC set point for the cell.

9. The method of claim 1, further comprising taking the cell offline and applying the voltage to the load when the cell is offline.

10. A Multiple Output Dynamically Adjustable Capacity System (MODACS), comprising:
  a cell;
  a load in thermal communication with the cell;
  an equivalent model of the cell that is electrically parallel to the load;
  a processor configured to:
    apply a voltage to the load and to the equivalent circuit model, wherein applying the voltage to the load generates heat at the cell, thereby affecting a temperature of the equivalent circuit model of the cell;
    measure a parameter of the equivalent circuit model in response to the heat generated by the load; and
    compare the parameter of the equivalent circuit model to an ideal model of the cell to determine a state of health of the cell; and
    control an operation of the cell based on the state of heath of the cell to meet a power requirement for the cell.

11. The MODACS of claim 10, wherein the load is at least one of: (i) an isolated programmable load; (ii) a field effect transistor (FET) internal to the MODACS; (iii) a FET powered by the cell; and (iv) a FET isolated from the cell.

12. The MODACS of claim 11, wherein the isolated programmable load is a FET and the voltage is a pulsed voltage pattern applied at a gate of the FET.

13. The MODACS of claim 10, wherein applying the voltage to the load generates a current through the cell.

14. The MODACS of claim 13, wherein the heat is generated at the cell by at least one of: (i) convection via applying the voltage at the load; and (ii) conduction via passing the current through the cell.

15. The MODACS of claim 10, wherein the processor is further configured to compare the parameter of the equivalent circuit model to the parameter of an ideal model of the cell to determine a set point for operating the MODACS based on the state of health.

16. The MODACS of claim 10, wherein the equivalent circuit model includes an RC pair and the parameter is a decay rate of the RC pair.

17. The MODACS of claim 10, wherein the processor is further configured to control the operating parameter of the cell to perform at least one of: (i) draining the cell; and (ii) operating the MODACS at a determined SOC set point for the cell.

18. The MODACS of claim 10, wherein the processor is further configured to take the cell offline and apply the voltage to the load when the cell is offline.

19. The method of claim 3, wherein applying the voltage further comprises applying the pulsed voltage pattern to operate the field effect transistor in a saturated region.

20. The MODACS of claim 12, wherein the pulsed voltage pattern operates the field effect transistor in a saturated region.

* * * * *